US008088446B2

(12) United States Patent
Billast

(10) Patent No.: US 8,088,446 B2

(45) **Date of Patent: *Jan. 3, 2012**

(54) METHOD FOR IMPROVING ACCOUSTIC PROPERTIES

(75) Inventor: Karl M. D. B. Billast, Leefdaal (BE)

(73) Assignee: Ferro (Belgium) S.P.R.L., Brussels (BE)

(*) Notice: Subject to any disclaimer, the term of this patent is extended or adjusted under 35 U.S.C. 154(b) by 115 days.

This patent is subject to a terminal disclaimer.

(21) Appl. No.: 11/910,534

(22) PCT Filed: Apr. 6, 2006

(86) PCT No.: PCT/BE2006/000031

§ 371 (c)(1), (2), (4) Date: Oct. 3, 2007

(87) PCT Pub. No.: WO2006/105623

PCT Pub. Date: Oct. 12, 2006

(65) Prior Publication Data

US 2009/0130316 A1 May 21, 2009

(30) Foreign Application Priority Data

Apr. 8, 2005 (WO) ................ PCT/BE2005/000053

(51) Int. Cl.
*B05D 3/02* (2006.01)

(52) U.S. Cl. .................. 427/374.1; 427/372.2; 427/384; 427/385.5

(58) Field of Classification Search ........................ None
See application file for complete search history.

(56) References Cited

U.S. PATENT DOCUMENTS 2,956,978 A * 10/1960 Ingwalson et al. ....... 106/169.36
3,466,257 A * 9/1969 Coulson ........................ 524/145
4,900,771 A * 2/1990 Gerace et al. ................. 524/296
5,741,824 A * 4/1998 Butschbacher et al. ...... 427/195
5,756,555 A * 5/1998 Wesch et al. .................... 521/73
6,136,923 A * 10/2000 Cheung et al. ................ 525/214
6,184,278 B1 * 2/2001 Arendt et al. ................ 524/284
6,319,969 B1 * 11/2001 Walther et al. ................ 524/300
6,531,541 B1 * 3/2003 Desai et al. ................... 524/832
6,855,741 B2 * 2/2005 Wiese et al. .................. 521/117
7,861,477 B2 * 1/2011 Donetti et al. ............... 52/403.1
2002/0019480 A1 * 2/2002 Munro et al. ................. 524/589
2004/0063834 A1 * 4/2004 Duran Gonzalez et al. .. 524/292
2005/0020718 A1 * 1/2005 Gosse et al. .................. 523/105
2006/0081415 A1 * 4/2006 Knauer et al. ................ 181/135
2007/0078206 A1 * 4/2007 Clair ............................ 524/287

FOREIGN PATENT DOCUMENTS

GB 500298 2/1939
WO 99/58597 11/1999
WO 2006/105620 A1 10/2006

OTHER PUBLICATIONS

Abstracts and partial machine translation of JP 05-009355, Jan. 1993.*

Abstracts and partial machine translation of JP 2000-169756, Jun. 2000.*

Bibliographic Abstract for Japanese Patent Publication No. JP2000169756 published Jun. 20, 2000, one page.

Bibliographic Abstract for Japanese Patent Publication No. JP5009355 published Jan. 19, 1993, one page.

International Search Report for PCT/BE2006/000031 mailed Aug. 11, 2006, three pages.

* cited by examiner

*Primary Examiner* — Erma Cameron

(74) *Attorney, Agent, or Firm* — Rankin, Hill & Clark LLP

(57) ABSTRACT

A method for improving acoustic properties of sheets, in particular for use in automotive application, is disclosed. An anhydrous sealant composition consisting of three major components, namely a selected polymer, a benzoate plasticizer and an additive, in particular a filler, is applied is applied to the sheets which are subsequently submitted to a heat treatment at a temperature in the range of from 100-240° C. for a period of 1 minute to two hours. The preferred plasticizer for use in the method of this invention is a dibenzoate plasticizer.

27 Claims, No Drawings

METHOD FOR IMPROVING ACCOUSTIC PROPERTIES

This invention relates to a method for improving acoustic dampening properties of sheets, in particular for automotive application. The inventive process comprises the steps of applying, to the sheets, a substantially non-aqueous acoustic sealant composition consisting essentially of a polymeric component in combination with a major level of a benzoate plasticizer and additives, including fillers, followed by heat treatment of the sheets to which the sealant composition has been applied.

Various technologies aiming at mitigating acoustic nuisances are known and have found established commercial application. The pertinent state of the art, and its shortcomings, is consequently well known. Japanese patent application JP 10237250 discloses coating compositions with good sound insulating properties containing vinyl chloride polymers in combination with a mixture of conventional plasticizers, namely diheptyl phthalate and diisononyl phthalate, fillers and additives. Japanese patent application JP 10237249 discloses comparable compositions having sound insulating properties containing vinyl chloride resins, phthalate plasticizers, fillers, liquid asphalt and adhesives. Japanese patent application JP 05279623 describes compositions for automotive application comprising elastomers embodying vinyl polymer and diolefin polymer blocks and hydrogenated indene resins. RO 100918 patent application pertains to anticorrosive and sound absorbing epoxy resin compositions prepared by mixing epoxy resin, butyl glycidyl and phenyl glycidyl ethers and dehydrated coal tar pitch. Japanese patent application JP 03144195 concerns compositions for vibration damping and sound attenuation containing a bituminous sheet and a thermosetting resin layer, optionally protected with an outer layer. The resin layer contains an epoxy resin and fillers. WO 99/58597 divulges water-based acoustic dampening compostions containing acrylic resin-based plastisol into which is incorporated a recycled paint polymer containing uncured resin and conventional plasticizers. DE 43 18 712 describes sprayable plastisol formulations exhibiting acoustic dampening properties. These formulations contain a major level of a crosslinkable, during application, mixture of a styrene polymer and a major level of a plasticizer together with fillers, reactive additives and other components in addictive levels which are used for their established functionality within the borders of plastisol technologies. The plasticizers are conventional. JP 2000-169756 pertains to known automotive coatings capable of providing a barrier against corrosion, mechanical damage and high frequency noise originating from factors different from the automotive body e.g. stone projections. The JP technology provides high frequency dampening contrary to the object of the inventive technology seeking enhanced low frequency dampening over a broad range of temperatures, namely of from −20 to 50° C. JP 05009355 discloses a plastisol composition consisting of a vinyl chloride-type resin and a plasticizer containing a major amount of a benzoic acid ester of a $C_{2-15}$ alkylene glycol or a $C_{4-12}$ oxy-alkylene glycol. The composition can be used as a coating on cars to provide a barrier against chipping and mechanical damage originating from sources different from the automotive body. EP-A-0 416 822 divulges stain-resistant plasticizer compositions containing mono- and di-esters of 2,2,4-trimethyl-1,3-pentanediol and benzoic acids possibly in combination with homopolymers or copolymers of vinyl chloride. These compostions can be used as floor coverings and wall coverings and were found to impart desirable stain resistance properties to the coverings. The esters can also be used as synthetic lubricants and as functional fluids such as automatic transmission fluids. EP-A-1 505 104 discloses foaming compositions containing at least one polymeric component, e.g. PVC, at least one primary plasticizer and a benzoic acid isononyl ester whereby the level of the plasticizer represents from 10 to 400 parts by weight per 100 parts by weight of the polymer. Di-benzoic acid esters can be used as primary plasticizers. The foaming composition of this reference can be used for the manufacture of floor coverings, synthetic leather and carpets.

The prior art is, as shown above, diverse and expresses a standing desire for optimizing, improving and mitigating acoustic inconveniences, for example in relation to automotive application.

It is a major object of this invention to provide means for improving acoustic properties of sheets.

It is another object of this invention to provide sound dampening benefits with the aid of plasticizer containing sealant compositions. Yet another object of this invention aims at providing means capable of delivering superior sound dampening versus sealant compositions based on conventional plasticizers. Yet a further object of this invention aims at dampening acoustic inconveniences of low frequencies, usually in the range of from 100 to 4000 Hz, at temperatures e.g. in the range of from −20° C. to 50° C. Yet another object of the invention aims at mitigating the adsorption of low frequency noise originating from the automotive body. The above and other objects can now be met by means of the inventive technology described hereinafter.

The "percentage" or "%" indications used in the description stand, unless defined differently, for "percent by weight".

A method for improving acoustic properties of sheets has now been discovered comprising a series of essential steps. In detail the following essential method sequence is required in accordance with the invention herein:

(i) applying to the sheets an acoustic sealant composition consisting essentially of:

(a) from about 20% to about 80% by weight of a polymeric component;

(b) from about 5% to about 60% by weight of a benzoate plasticizer; and (c) from about 15% to about 65% by weight of additives including fillers, organic diluents, pigments and adhesion promoters;

whereby the water level in the sealant composition is less than 2% by weight and the ponderal ratio of the polymeric component to the total plasticizer is, at least, 0.8;

(ii) followed by a heat treatment of the sheet to which the sealant composition has been applied at a temperature in the range of from 100° C. to 220 C for a period of from 1 minute to 2 hours; and (iii) cooling, in a manner known per se, the sheets to ambient temperature.

The method of this invention requires applying to the sheets an acoustic sealant composition. The application of the like functional compositions to a surface is well known in the domain of the technology. As an example of such application to sheets, e.g. vehicle metal surfaces, the sealant composition can be sprayed onto the surface. Preparatory to such spray on of the sealant, the surface can be treated by dip-phosphating and electrocoating. The sheets are subsequently submitted to a heat treatment at a temperature in the range of from 100° C. to 220° C. for a period of 1 minute to 2 hours, preferably at a temperature in the range of from 110° C. to 190° C. for a period of from 6 minutes to 90 minutes. As an actual example, the surface (sheet) to which the sealant has been applied can be moved through sequential temperature zones as follows:

from 20° C. to 143° C. in 15 minutes, maintained at 145° C. during 5 minutes, heated from 145° C. to 160° C. in 15 minutes followed by a cooling zone from 160° C. to 125° C. in 15 minutes. The sheet is thereafter maintained at 125° C. during 10 minutes followed by cooling to ambient temperature. In practice, a car assembly (manufacturing) arrangement can be divided in 3 steps, namely: a first step called the “fabrication plant/body shop” where initial fabrication is completed; step 2 is known as the “paint shop”; whereas step 3 can be termed the trim shop. The sealant is usually applied to the surfaces and submitted to a temperature treatment in the paint shop. After the dip-phosphating and the electrocoat of the surfaces, a sequence of operations can be in order e.g. as follows: sealing of joints; grinding and washing; primer; grinder and washing; followed by “basecoat” and “topcoat”.

The sealant compositions to be applied to the sheets are non-aqueous containing a level of water in the sealant composition of less than 2%, preferably less than 0.5%, most preferably less than 0.2%.

The sealant compositions for use in the method of the invention contain as a first essential component a polymeric ingredient that is compatible with a plasticizer for application onto a surface. Preferred polymeric species herein are selected from the group of polyvinyl chloride, acrylic polymers, cured epoxy resins and mixtures thereof. The polymers can be represented by homopolymers and copolymers. The acrylic polymer component can comprise homo- or copolymers derived from monomers comprising alkylmethacrylates and alkylacrylates. The alkyl moieties in both, the methacrylates and the acrylates, species can be represented by $C_1$-$C_{10}$ alkyl, more preferably $C_1$-$C_4$ alkyl radicals. The epoxy resins, which are cured during application, are based on: bisphenol A which has been reacted with epichlorhydrin; or an aliphatic polyglycol that has also been reacted with epichlorhydrin. The preferred aliphatic polyglycol can be represented by polypropylene glycol. Both epoxy resins can be reacted with curing agents such as primary and secondary amines, anhydrides, polyamides and catalytic curing agents such as tertiary amines, amine salts, boron trifluoride complexes and amine borates. The epoxy curing agents are added to the compositions and the curing (crosslinking) takes place during application, in the case of acoustic application frequently at temperatures equal to or greater than 100° C. Latent catalysts, such as $BF_3$.MEA (borontrifluoride monoethylamine) complex or dicyandiamide can be used to obtain very long, up to several months, potlives. Dicyandiamide can be used as a suitable curing agent. Tertiary amines can be used to accelerate the curing. The selection of epoxy resins and curing agents can be done routinely and the domain of such cured resins is eminently well known. The polymeric component represents broadly from 20% to 80%, more preferably from 30% to 70%, of the inventive compositions. In one preferred execution, the polymeric component can be represented by a mixture of, expressed on a 100% basis, from 50-80% of polyvinyl chloride and from 50-20% of the acrylic polymer.

The benzoate plasticizer can be represented by known species. The benzoate plasticizer component is used in levels of from 5% to 60%, preferably of from 40% to 15% of the inventive compositions. Preferred benzoate plasticizers comprise mono- and di-benzoate species corresponding to the formula:

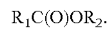

$$R_1C(O)OR_2.$$

wherein $R_1$ represents a phenyl radical, $R_2$ represents —$R_3O(O)CR_1$ wherein $R_3$ is a divalent radical of the formula —$R_4(OR_4)_m$—, wherein $R_4$ is an alkyl radical containing from 2 to 4 carbon atoms and m represents 0 or the integer 1 or 2; or $R_2$ represents an alkyl radical containing from 3 to 21 carbon atoms. The individual benzoate plasticizer species e.g. can be used in any (ponderal) proportion. In one preferred execution a monobenzoate plasticizer is used in a ponderal proportion of up to 40% based on the total weight (100%) of the sum of the mono- and di-benzoate species.

Preferred benzoate plasticizers are dibenzoate esters, most preferably $(propyleneglycol)_{1-4}$ dibenzoates, $(ethyleneglycol)_{1-4}$ dibenzoates and dibenzoate esters of 2,2,4-trimethyl-1,3-pentane diol. The dibenzoate plasticizers can, in preferred embodiments, be used in mixture with a second (non-benzoate) plasticizer including benzylphthalates and conventional plasticizer species other than benzylphthalates. The ponderal proportions of the second plasticizer are, expressed in relation to the total level (benzoate+second plasticizer) of plasticizer (100%), as follows:

benzylphthalate: up to 50%; and conventional plasticizer, other than benzylphthalates: up to 70%, preferably up to 40%; and monobenzoate plasticizers up to 40%.

Preferred monobenzoate plasticizers can be represented by a monobenzoate ester of a $C_3$-$C_2$, alcohol and a monobenzoate ester of 2,2,4-trimethyl-1,3-pentanediol.

Benzylphthalate plasticizers are well known and have found widespread commercial application. Benzylphthalates are alkylbenzylphthalates wherein the alkyl chain, possibly branched and/or substituted, contains from 2 to 16 carbon atoms. Examples of other conventional plasticizers are dialkyl phthalates such as di(2-ethylhexyl)phthalate, di-isononyl phthalate, di-isodecyl phthalate, diundecyl phthalate, dibutyl phthalate, dioctyl phthalate, $C_3$-$C_{24}$ esters of adipic, azelaic, sebacic, trimellitic, citric and phosphoric acid, alkyl esters, of fatty acids, alkyl sulfonic acid esters of phenols and epoxidized triglycerides. A preferred conventional plasticizer, other than benzylphthalates, can be represented by $(ethylene\ glycol)_{2-4}$-di($C_2$-$C_{22}$ alcanoate), more preferably -di($C_4$-$C_{16}$ alcanoate). The ponderal ratio of the polymer component to the total plasticizer component is, at least, 0.8, preferably in the range of from 1.0 to 4.0, more preferably of from 1.2 to 2.5. In such ponderal ratios, the plasticizer is based on the total level of plasticizer i.e. the sum of the benzoate species and the second non-benzoate plasticizer The compositions for use in the method herein further contain of from about 15% to about 65% of additives, including fillers, organic diluents including solvents and rheology adjusters, pigments and adhesion promoters. The filler component as such represents generally of from 7% to 62%, more preferably of from 10% to 60% of the compositions. The filler serves to, among others, increase the density of the coating and also to enhance the dampening efficacy. The filler can be represented by chemically inert materials. While usually inorganic fillers are exemplified, it goes without saying that various other e.g. compatible polymeric fillers can be used. The sum of the non-filler additives is preferably used in levels ranging from 2% to 15% of the composition. The non-filler additives generally are used for their art established functionalities in application conventional levels. Examples of non-filler additives are organic diluents, including solvents, and rheology adjusters. The organic diluents can be represented by $C_8$-$C_{22}$ alcanes, $C_8$-$C_{22}$ iso- and normal-paraffins, alkylbenzenes having from 3 to 21 carbon atoms in the alkyl chain and alpha-olefins with 4 to 21 carbon atoms and naphthenic solvents. Suitable fillers can be represented by calcium carbonate, magnesium carbonate and metal oxides such as zinc oxide, calcium oxide, silica and mixtures thereof are frequently used in levels ranging from 10% to 60%. Adhesion promoters and pigments can be used usually in amounts of from 0.1 to 5%, preferably of from 0.3 to 0.5% for each of such individual additives. Preferred adhesion promoters can be polyamidoamines.

The acoustic dampening benefits of the method of this invention can be measured with the Oberst bar as, for instance, described in the Renault method D45 1809/. This method is used to study the dampening properties of coated metal bars. The coating consists of a sealant formulation. For comparative testing purposes, sheets to which the sealant have been applied, having a thickness of 2 mm, are heated to 160° C., maintained at that temperature during 45 minutes and cooled to ambient temperature. The testing measurements on such sheets are in good correlation with DMTA measurements.

It is known that there is a good correlation between the Oberst bar and a DMTA (Dynamic Mechanical Thermal Analysis) testing. In this latter method, the fused plastisol formulation or the cured epoxy resin formulation is studied without the metal bar. The change in internal molecular mobility is actually measured. The results are expressed in "tangens delta" values that define the acoustic dampening. Maximum dampening occurs at the glass transition temperature (Tg).

Sealants suitable for use in the claimed method and prior art sealants were evaluated by means of the DMTA method. The sealants were fused in a mold at 160° C. for 45 minutes to thereby yield samples having a thickness of 2 mm (millimeters). The DMTA test was run under the following conditions: dynamic temperature sweeps between −100° C. and +150° C. with a heating rate of 4° C./minute at a constant frequency of 5 Hz (31.4 rad/sec). The components in the compositions tested were, in parts by weight, as follows.

| Example | 1 (c) | 2 |
|---|---|---|
| Polyvinylchloride (emulsion grade) | 70 | 70 |
| Polyvinylchloride (extender grade) | 30 | 30 |
| Diisononylphthalate | 50 | — |
| Dipropyleneglycol dibenzoate | — | 50 |
| Dearomatized hydrocarbon fluid | 10 | 10 |
| Calcium carbonate | 30 | 30 |
| Calcium oxide | 4 | 4 |

(c) = comparative.

The testing data, measuring the tangens delta values, were as follows:

| | Tangens delta at ° C. | | | | |
|---|---|---|---|---|---|
| Example | 0 | 10 | 20 | 30 | 40 |
| 1 | 0.3 | 0.33 | 0.38 | 0.4 | 0.3 |
| 2 | 0.3 | 0.65 | 0.85 | 0.8 | 0.35 |

The results show that the tangens delta, a measure of the dampening properties, is unexpectedly and significantly superior for the dibenzoate execution of the inventive method as compared to the art.

Acoustic polyalkylmethacrylate plastisol sealants having the listed compositions, in parts by weight, were tested as described for Example 1.

| Example | 3 | 4 (c) |
|---|---|---|
| Polymethylmethacrylate (emulsion resin) (i) | 70 | 70 |
| Polymethylmethacrylate (extender bead) (ii) | 30 | 30 |
| Dipropylene glycol dibenzoate | 100 | — |
| Diisoheptyl phthalate | — | 100 |
| Dearomatized hydrocarbon fluid | 10 | 10 |
| Calcium carbonate | 30 | 30 |
| Calcium oxide | 4 | 4 |

(i): DEGALAN ™ BM 310, Rohm GmbH & Co. Germany
(ii): DEGALAN ™ 8744, Rohm GmbH & Co. Germany The DMTA testing results were as follows:

| | Tangens delta at ° C. | | | | | |
|---|---|---|---|---|---|---|
| Example | 0 | 10 | 20 | 40 | 60 | 80 |
| 3 | 0.6 | 0.95 | 1.4 | 0.65 | 0.2 | 0 |
| 4 | 0.18 | 0.2 | 0.22 | 0.38 | 1.1 | 0.25 |

The results show that the sound dampening properties of the dibenzoate method of this invention were significantly superior, in particular within conventional automotive usage temperature ranges, as compared to a phthalate plasticizer. In addition, conventional phthalate plasticizers are subject to exudation which can move the maximum tangens delta values, or effective sound dampening, out of the temperature range of the contemplated application.

Another series of comparative tests were run thereby using the recited formulations (components expressed in parts by weight) to illustrate the benefits attached to the claimed technology. The data were generated as described in Example 1.

| Example | 5 (c) | 6 (c) | 7 | 8 |
|---|---|---|---|---|
| Polymethylmethacrylate (emulsion resin) (i) | 35 | 35 | 35 | 35 |
| Polymethylmethacrylate (extender bead) (ii) | 15 | 15 | 15 | 15 |
| Polyvinylchloride (emulsion grade) | 35 | 35 | 35 | 35 |
| Polyvinylchloride (extender grade) | 15 | 15 | 15 | 15 |
| Diisodecylphthalate | 75 | — | — | — |
| Isononylbenzylphthalate | — | 75 | — | — |
| Diethyleneglycol dibenzoate | — | — | 75 | — |
| Dipropyleneglycol dibenzoate | — | — | — | 75 |
| Dearomatized hydrocarbon fluid | 10 | 10 | 10 | 10 |
| Calcium carbonate | 30 | 30 | 30 | 30 |
| Calcium oxide | 4 | 4 | 4 | 4 |

The testing data, expressed in tangens delta, were as follows:

| | Tangens delta at ° C. | | | | | | |
|---|---|---|---|---|---|---|---|
| Example | 0 | 10 | 20 | 30 | 40 | 50 | 70 |
| 5 | 0.25 | 0.25 | 0.25 | 0.25 | 0.25 | 0.25 | 0.2 |
| 6 | 0.3 | 0.3 | 0.35 | 0.35 | 0.4 | 0.5 | 0.3 |
| 7 | 0.4 | 0.7 | 1.0 | 0.95 | 0.6 | 0.3 | 0.2 |
| 8 | 0.4 | 0.7 | 1.1 | 1.0 | 0.7 | 0.35 | 0.2 |

The results confirm the significantly superior dampening properties of the inventive method as compared to state-ofthe-art technology. It is particularly noteworthy that the inventive technology produce benefits over a broad range of usage temperatures.

Acoustic sealants based on epoxy resins, having the listed compositions expressed in parts by weight, were performance tested, in the method of this invention, as described in Example 1.

| Example | 9 | 10(c) |
|---|---|---|
| Bisphenol A liquid epoxy resin | 40 | 40 |
| Propyleneglycol liquid epoxy resin | 60 | 60 |
| Dicyandiamide curing agent | 10 | 10 |
| Tertiary amine accelerator | 5 | 5 |
| Calcium oxide | 15 | 15 |
| Calcium carbonate | 200 | 200 |
| Dipropyleneglycol dibenzoate | 30 | — |
| Diisononylphthalate | — | 30 |

The DMTA testing results were as follows:

| | Tangens delta at ° C. | | | | | |
|---|---|---|---|---|---|---|
| Example | −10 | 0 | 10 | 20 | 30 | 70 |
| 9 | 0.2 | 0.42 | 0.55 | 0.57 | 0.38 | 0.26 |
| 10 | 0.2 | 0.26 | 0.33 | 0.38 | 0.38 | 0.26 |

The testing data confirm the beneficial dampening superiority of the claimed arrangement, particularly with respect to conditions prevailing in moderate climates.

The beneficial acoustic use of dibenzoate plasticizers or mixed dibenzoate/monobenzoate plasticizers in the claimed method is further illustrated with the aid of specific executions as follows. These compositions, expressed in parts by weight, were performance tested as described in Example 1.

| Example | 11 | 12 | 13 |
|---|---|---|---|
| Polyvinyl chloride (emulsion grade) | 70 | 70 | 70 |
| Polyvinyl chloride (extender grade) | 30 | 30 | 30 |
| Dipropylene glycol dibenzoate | 50 | 50 | 50 |
| Dearomatized hydrocarbon fluid | 10 | — | — |
| 2-Ethylhexyl benzoate | — | 15 | — |
| Benzoate ester of 2,2,4 trimethylpentane diol isobutyrate | — | — | 15 |
| Calcium carbonate | 30 | 30 | 30 |
| Calcium oxide | 4 | 4 | 4 |

The DMTA data were as follows.

| | Tangens delta at ° C. | | | | | |
|---|---|---|---|---|---|---|
| Example | −10 | 0 | +10 | +20 | +30 | +40 |
| 11 | 0.2 | 0.3 | 0.44 | 0.52 | 0.54 | 0.38 |
| 12 | 0.3 | 0.48 | 0.72 | 0.68 | 0.40 | 0.36 |
| 13 | 0.2 | 0.35 | 0.60 | 0.68 | 0.48 | 0.42 |

The data evidence the acoustic benefits attached to the use of the claimed method.

To provide further showings of the beneficial sound dampening properties of the inventive technology, Example 7 of JP-A-2000-169756 was evaluated and compared to Examples 1(c) and 2 described in this patent document.

The composition in accordance with the Japanese patent contained the listed ingredients, expressed in parts by weight, as follows.

| | |
|---|---|
| PVC Emulsion grade | 70 |
| PVC Extender | 30 |
| Calcium carbonate | 150 |
| Calcium oxide | 30 |
| Dipropyleneglycol dibenzoate | 150 |
| Tricresyl phosphate | 150 |
| Diluent (Exxsol D100) | 30 |
| Various ($TiO_2$; foamer; amine; etc.) | 24.5 |
| Total | 634.5 |

Ingredients in the comparative compositions vary, expressed in % by weight, as follows:

| Ingredient | Japanese | Example 1 | Example 2 |
|---|---|---|---|
| PVC | 15.8 | 54 | 54 |
| Plasticizer | 47.3 | 27 | — |
| Filler | 32 | 18.5 | 18.5 |
| Di-benzoate | 23.5 | — | 27 |

The comparative testing data, measuring the tangens delta values, were as follows.

| Temperature ° C. | Japanese | Example 1 | Example 2 |
|---|---|---|---|
| −50 | 0.2 | 0 | 0 |
| −40 | 0.8 | 0 | 0 |
| −30 | 1.4 | 0 | 0 |
| −20 | 0.7 | 0 | 0 |
| −10 | 0.2 | 0 | 0 |
| 0 | 0 | 0.3 | 0.3 |
| 10 | 0 | 0.33 | 0.65 |
| 20 | 0 | 0.38 | 0.85 |
| 30 | 0 | 0.4 | 0.8 |
| 40 | 0 | 0.3 | 0.35 |

These data show that the Japanese technology does not suppress acoustic inconveniences at low frequencies, preferably in the range of from 20 to 500 Hz, more preferably 150 to 250 Hz, at ambient temperature contrary to the inventive technology.

The invention claimed is:

1. A method for improving acoustic dampening properties of sheets, comprising:

(i) applying to the sheets an acoustic sealant composition consisting essentially of:

(a) from about 20% to about 80% by weight of a polymeric component selected from the group consisting of acrylic polymers, cured epoxy resins, and mixtures thereof;

(b) from about 5% to about 60% by weight of a dibenzoate plasticizer; and (c) from about 15% to about 65% by weight of additives selected from the group consisting of fillers, organic diluents, pigments, adhesion promoters, and combinations thereof;

wherein the sealant composition includes less than 2% by weight water and the weight ratio of the polymeric component to a total plasticizer amount is at least 0.8;

(ii) heat treating the sheet at a temperature in the range of from 100° C. to 220° C. for a time period of from 1 minute to 2 hours; and (iii) cooling the sheets to ambient temperature.

2. The method of claim 1, wherein the polymeric component represents from 30% to 70% by weight and the dibenzoate plasticizer represents from 40% to 15% by weight of the sealant composition.

3. The method of claim 1, wherein the acrylic polymer is selected from homopolymers or copolymers of alkylmethacrylates and alkylacrylates wherein the alkyl radicals in the methacrylates and in the acrylates are $C_1$-$C_{10}$ carbon chains.

4. The method of claim 3, wherein the alkyl radicals in the methacrylates and in the acrylates are $C_1$-$C_4$ carbon chains.

5. The method of claim 1, wherein the plasticizer is selected from the group consisting of (propyleneglycol)$_x$-dibenzoate, (ethyleneglycol)$_x$-dibenzoate, wherein X is an integer of from 1 to 4, dibenzoate ester of 2,2,4-trimethyl-1,3-pentane diol and mixtures thereof.

6. The method of claim 1, wherein the heat treatment is applied at a temperature of from 110° C. to 190° C. for a time period of from 6 minutes to 90 minutes.

7. The method of claim 1, wherein the sealant composition includes 2% to 15% by weight of organic diluents selected from the group consisting of $C_8$-$C_{22}$ alkanes, $C_8$-$C_{22}$ iso- and normal-paraffins, naphthenic solvents, alkylbenzenes having from 3 to 21 carbon atoms in the alkyl chain, and alpha-olefins with 4 to 21 carbon atoms, and 7% to 62% by weight of a filler selected from the group consisting of calcium carbonate, magnesium carbonate, silica, zinc oxide, calcium oxide and mixtures thereof.

8. The method of claim 1, wherein the polymer component includes from 50-20% by weight of an acrylic polymer.

9. The method of claim 1, wherein the weight ratio of the polymeric component to the total plasticizer amount is from 1.0 to 4.0.

10. The method of claim 1, wherein the sheet is a part of a wheeled vehicle.

11. A method for improving acoustic dampening properties of sheets, comprising:

applying to the sheets an acoustic sealant composition consisting essentially of:

(a) from about 20% to about 80% by weight of a polymeric component selected from the group consisting of acrylic polymers, cured epoxy resins, and mixtures thereof;

(b) from about 5% to about 60% by weight of a dibenzoate plasticizer; and (c) from about 15% to about 65% by weight of additives selected from the group consisting of fillers, organic diluents, pigments, adhesion promoters, and combinations thereof;

wherein the sealant composition includes less than 2% by weight water and the weight ratio of the polymeric component to a total plasticizer amount is at least 0.8;

(ii) heat treating the sheet at a temperature in the range of from 100° C. to 220° C. for a time period of from 1 minute to 2 hours; and (iii) cooling the sheets to ambient temperature, wherein the sheets exhibit improved acoustic dampening properties including suppression of acoustic noise in the range of from 20 to 500 Hz.

12. The method of claim 11 wherein the suppression is in the range of from 150 to 250 Hz.

13. The method of claim 11, wherein the polymeric component represents from 30% to 70% by weight and the dibenzoate plasticizer represents from 40% to 15% by weight of the sealant composition.

14. The method of claim 11, wherein the acrylic polymer is selected from homopolymers or copolymers of alkylmethacrylates and alkylacrylates wherein the alkyl radicals in the methacrylates and in the acrylates are $C_1$-$C_{10}$ carbon chains.

15. The method of claim 11, wherein the plasticizer is selected from the group consisting of (propyleneglycol)$_x$-dibenzoate, (ethyleneglycol)$_x$-dibenzoate, wherein X is an integer from 1 to 4, dibenzoate ester of 2,2,4-trimethyl-1,3-pentane diol and mixtures thereof.

16. The method of claim 11, wherein the heat treatment is applied at a temperature of from 110° C. to 190° C. for a time period of from 6 minutes to 90 minutes.

17. The method of claim 11, wherein the sealant composition includes 2% to 15% by weight of organic diluents selected from the group consisting of $C_8$-$C_{22}$ alkanes $C_8$-$C_{22}$ iso- and normal-paraffins, naphthenic solvents, alkylbenzenes having from 3 to 21 carbon atoms in the alkyl chain, and alpha-olefins with 4 to 21 carbon atoms, and 7% to 62% by weight of a filler selected from the group consisting of calcium carbonate, magnesium carbonate, silica, zinc oxide, calcium oxide and mixtures thereof.

18. The method of claim 11, wherein the polymer component includes from 50-20% by weight of an acrylic polymer.

19. The method of claim 11, wherein the weight ratio of the polymeric component to the total plasticizer amount is from 1.0 to 4.0.

20. The method of claim 11, wherein the sheet is a part of a wheeled vehicle.

21. A method for improving acoustic dampening properties of sheets, comprising of:

(i) applying to the sheets an acoustic sealant composition including from about 20% to about 80% by weight of a polymeric component selected from the group consisting of acrylic polymers, cured epoxy resins, and mixtures thereof; from about 5 to about 60% by weight of a dibenzoate plasticizer; and from about 15% to about 65% by weight of additives selected from the group consisting of fillers, organic diluents, pigments adhesion promoters, and combinations thereof;

(ii) neat treating the sheet at a temperature in the range of from 100° C. to 220° C. for a time period of from 1 minute to 2 hours;

(iii) cooling the sheets to ambient temperature;

wherein the sheets suppress acoustic noise in the range of from 20 to 500 Hz.

22. The method of claim 21 wherein the sheets suppress acoustic noise in the range of from 150 to 250 Hz.

23. A method for improving acoustic dampening properties of sheets, comprising of:

(i) applying to the sheets an acoustic sealant composition including from about 20% to about 80% by weight of a polymeric component selected from the group consisting of acrylic polymers, polyvinyl chloride, and mixtures thereof; from about 5% to about 60% by weight of a dibenzoate plasticizer; and from about 15% to about 65% by weight of additives selected from the group consisting of fillers, organic diluents, pigments adhesion promoters, and combinations thereof;

(ii) neat treating the sheet at a temperature in the range of from 100° C. to 220° C. for a time period of from 1 minute to 2 hours;

(iii) cooling the sheets to ambient temperature;

wherein the sheets suppress acoustic noise in the range of from 20 to 500 Hz.

24. The method of claim 23 wherein the sheets suppress acoustic noise in the range of from 150 to 250 Hz.

25. The method of claim 23, wherein the polymer component includes 50-80% by weight of polyvinyl chloride and from 50-20% by weight of an acrylic polymer.

26. The method of claim 23 wherein the sealant composition includes less than 2% by weight water and the weight ratio of the polymeric component to a total plasticizer amount is at least 0.8.

27. The method of claim 26, wherein the weight ratio of the polymeric component to the total plasticizer amount is from 1.0 to 4.0.

* * * * *